United States Patent [19]

Waggoner et al.

[11] Patent Number: 5,710,237
[45] Date of Patent: Jan. 20, 1998

[54] LIQUID CRYSTALLINE POLYESTER RESIN

[75] Inventors: Marion Glen Waggoner, Hockessin; Michael Robert Samuels, Wilmington, both of Del.

[73] Assignee: E. I. Du Pont de Nemours and Company, Wilmington, Del.

[21] Appl. No.: 436,990

[22] Filed: May 8, 1995

Related U.S. Application Data

[63] Continuation-in-part of Ser. No. 301,165, Sep. 6, 1994.

[51] Int. Cl.$^6$ .................................................. C08G 63/02
[52] U.S. Cl. ............................ 528/190; 528/190; 528/193; 528/194; 528/206; 528/212; 528/219; 528/272; 528/298; 528/302; 528/308; 528/308.6
[58] Field of Search ............................ 528/190, 193, 528/194, 206, 212, 219, 272, 298, 302, 308, 308.6

[56] References Cited

U.S. PATENT DOCUMENTS

| | | | |
|---|---|---|---|
| 4,169,933 | 10/1979 | Jackson, Jr. et al. | 528/190 |
| 4,375,530 | 3/1983 | Hay et al. | 524/605 |
| 4,831,103 | 5/1989 | Kock | 528/176 |
| 5,079,289 | 1/1992 | Layton et al. | 524/600 |
| 5,110,896 | 5/1992 | Waggoner et al. | 528/190 |
| 5,204,417 | 4/1993 | Stern et al. | 525/444 |
| 5,221,730 | 6/1993 | Morris et al. | 528/194 |
| 5,237,038 | 8/1993 | Morris et al. | 528/194 |
| 5,260,409 | 11/1993 | Jackson, Jr. et al. | 528/193 |
| 5,296,542 | 3/1994 | Layton et al. | 524/600 |

OTHER PUBLICATIONS

W. Jerome Jackson, Jr., Liquid Crystal Polymers. IV. Liquid Crystalline Aromatic Polyesters, *Paper presented at the "Liquid Crystal Polymers" Symposium*, pp. 1–7, Jul. 1980.
W. Jerome Jackson, Jr., Liquid Crystal Polymers. 5. Liquid Crystalline Polyesters Containing Napththaline Rings, *Macromolecules*, vol. 16, No. 7, pp. 1027–1033, Jul. 1983.

Primary Examiner—Samuel A. Acquah
Attorney, Agent, or Firm—James A. Forstner

[57] ABSTRACT

Liquid crystalline polyesters made from hydroquinone, terephthalic acid, 2,6-naphthalene dicarboxylic acid and 4-hydroxybenzoic acid, and having a selected composition range, have melting points of about 350° C. or less, good physical properties, and are readily manufactured. The polymers are useful as molding resins.

1 Claim, 2 Drawing Sheets

LIQUID CRYSTALLINE POLYESTER RESIN

The present invention is a continuation-in-part of application Ser. No. 08/301,165, filed Sep. 6, 1994 and entitled Liquid Crystalline Polyester Resin.

BACKGROUND OF THE INVENTION

Described herein are liquid crystalline polyesters made from hydroquinone, terephthalic acid, 2,6-naphthalene dicarboxylic acid and 4-hydroxybenzoic acid which have good physical properties, melting points of about 350° C. or less, and can be manufactured rapidly.

Thermotropic liquid crystalline polymers are well known, and are useful as molding resins (for electrical connectors and automotive parts, for example), films, barrier resins, and other uses for thermoplastics. Although these types of polymers are well known, there exists a need for such polymers which have good properties, are easy to prepare, and have relatively low cost.

SUMMARY OF THE INVENTION

This invention concerns a liquid crystalline polyester consisting essentially of repeat units of the formulas:

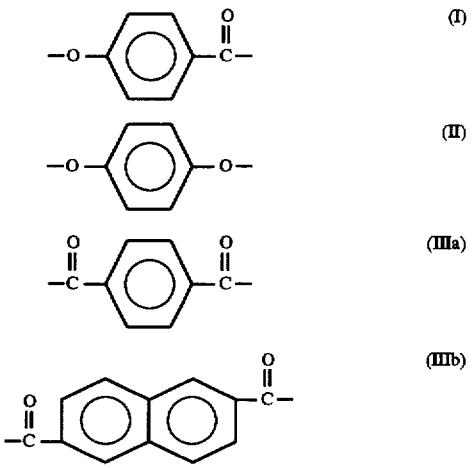

wherein:

repeat unit (I) constitutes 50 to 63 mole percent of said repeat units;

repeat unit (II) constitutes 18.5 to 25 mole percent of said repeat units;

repeat units (IIIa) plus (IIIb) constitute 18.5 to 25 mole percent of said repeat units;

the molar ratio of (IIIa):(IIIb) is 35:65 to 45:55; and the molar ratio of (II):[(IIIa)+(IIIb)] is about 1.

DETAILS OF THE INVENTION

The liquid crystalline polyester described herein is a completely aromatic polyester in which repeat unit (I) is derived from 4-hydroxy benzoic acid (HBA), repeat unit (II) is derived from hydroquinone (HQ), repeat unit (IIIa) is derived from terephthalic acid (TPA), and repeat unit (IIIb) is derived from 2,6-naphthalene dicarboxylic acid (NDA). Those persons skilled in the art will recognize that the total molar amount of HQ will be substantially equal to the total combined amount of TPA and NDA. In preferred polymers repeat unit (I) constitutes 53 to 60 mole percent of the polymer repeat units, and repeat unit (II) constitutes 20 to 23.5 mole percent of the polymer repeat units and repeat units (IIIa) and (IIIb), when combined constitutes 20 to 23.5 mole percent of the polymer repeat units.

Data from Examples 1–8 was used to calculate the contour plots, even though not all of the polymers made in these Examples are within the claimed composition range. The data were statistically analyzed and calculated using a program from SYSTAT, Inc., Evanston, Ill., U.S.A. called SYSTAT for Windows, Version 5, and using the contour plot routine.

Figure 1:
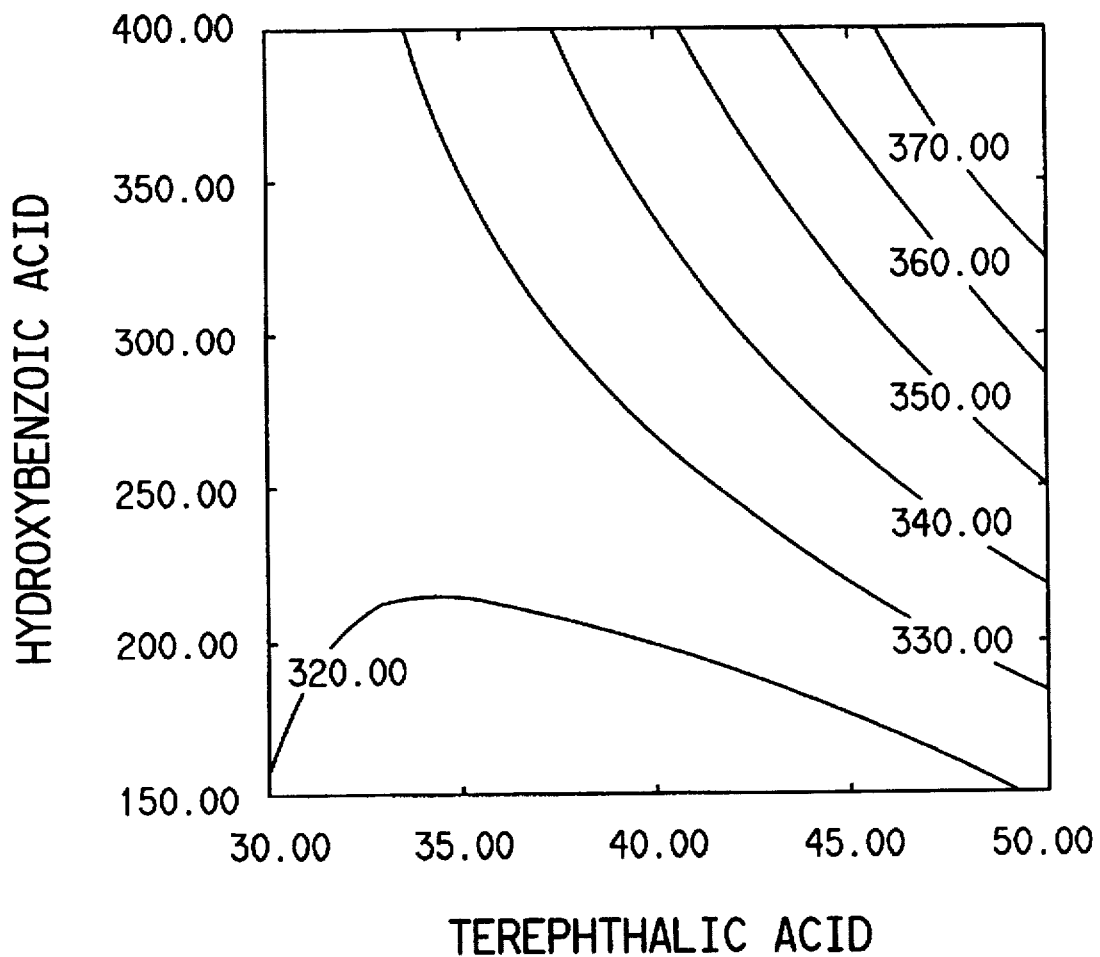
FIG. 1 is a contour plot of melting points vs. the two polymer compositional variables: the percent HBA [unit (I)] in the polymer; and amount of TPA (IIIa) in the ratio of (IIIa):(IIIb) (as described above). Each contour line represents a constant value for a melting point, which is shown.

It is evident from FIG. 1 that the melting points of the polymer composition range selected herein are about 350° C. or less. This is important to the synthesis of high quality polyesters. It has been the experience of the present inventors that when temperatures much above 350° C. are required to make a polyester liquid crystalline polymer; degradation of the starting materials and/or polymer products is markedly increased, thereby leading to undesirable effects such as excessive discoloration of the polyester. To avoid crystallization of the polymer, the polymerization is usually run at or above the melting point of the polymer. Therefore melting points of about 350° C. or below are desirable. However, in order to have a high use temperature for the polymer, melting points should also be as high as possible, i.e., in this case close to 350° C. The selected polymer compositions have such melting points, as shown by FIG. 1.

Figure 2:
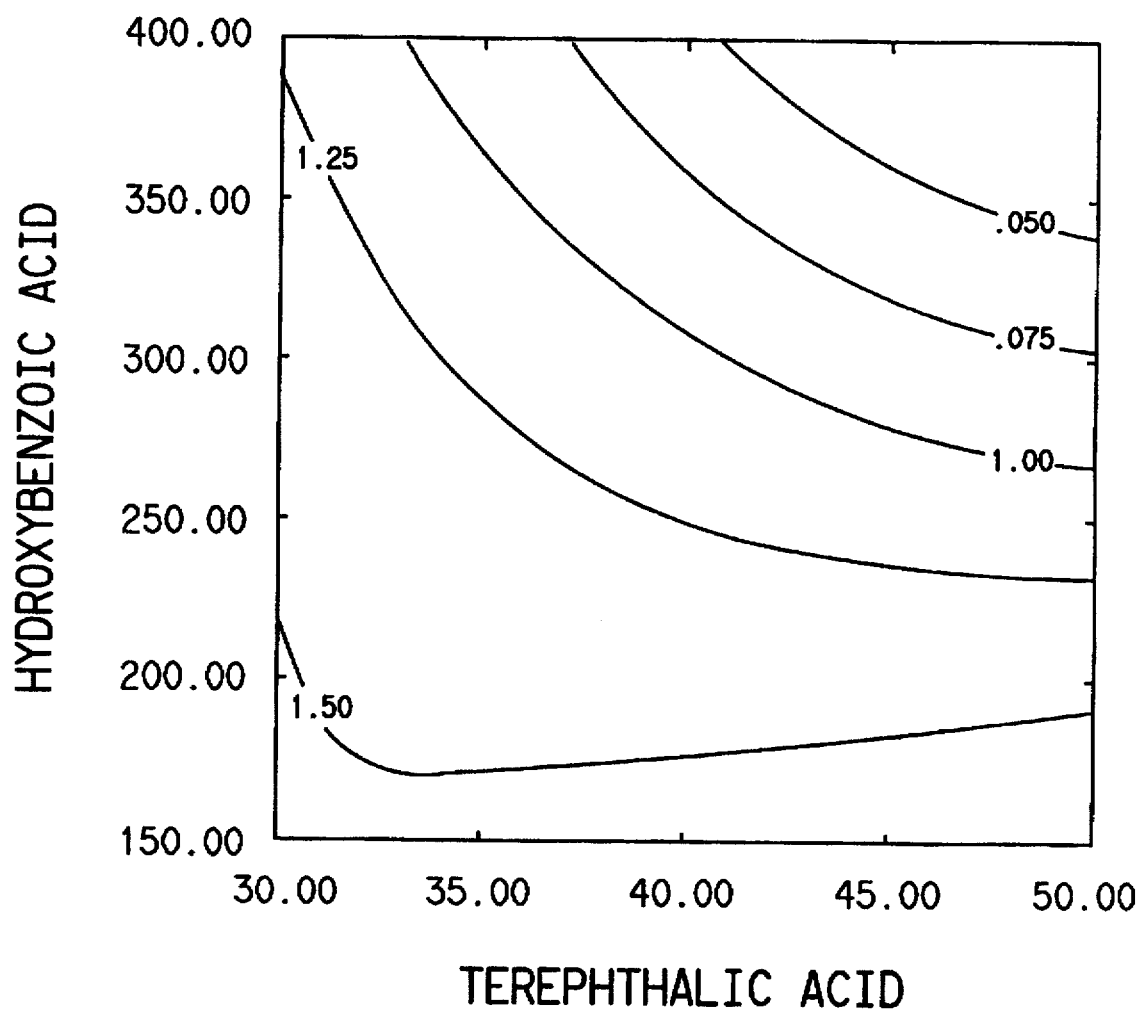
FIG. 2 is a contour plot of finishing time (in hours) vs. the two polymer compositional variables: the percent HBA [unit (I)] in the polymer; and amount of TPA (IIIa) in the ratio of (IIIa):(IIIb) (as described above). Each contour line is represents a constant value for the finishing time. By finishing time is meant the amount of time under full vacuum needed to reach a certain viscosity, as measured by torque on the stirrer (see the Examples).

For reasons of economy (higher productivity of the polymerization equipment), and to minimize polymer degradation at high temperatures, the finishing period should also be reasonably short. As can be seen from FIG. 2, polymers with about 50 mole percent or more of HBA-derived repeat units surprisingly have relatively short finishing times. While the absolute value of the finishing times will vary according to the quality of the monomers used, the size and configuration of the equipment used, etc., the relative order for the finishing times shown in FIG. 2 should not change in a set of polymerizations in which all other variables are held constant.

Therefore, it has been discovered that a selected compositional range of liquid crystalline polyesters made from HBA, HQ, TPA and NDA has an unexpected combination of good properties, ease of manufacture and less potential polymer degradation during synthesis.

The instant liquid crystalline polyesters can be made by methods known to the artisan for making aromatic polyesters. For instance, the acetate esters (or other low alkyl ester) of the hydroxyl groups in the basic monomers (the 2 hydroxyl groups of the HQ and the one of HBA) may be mixed with the diacids and heated, gradually removing byproduct acetic acid, to eventually form the desired polymer. In a variation of this procedure, the acetates can be formed in situ by adding slightly more than a stoichiometric amount of acetic anhydride to a mixture of all the monomers, heating the mixture to its boiling point, holding for a short time to acetylate the hydroxyl groups, and then performing the polymerization condensation. Alternatively the phenyl esters of the carboxylic acid groups in the monomers may be reacted with the hydroxyl groups, while removing byproduct phenol by distillation. The reactants are usually eventually heated above 300° C. under vacuum to achieve a desirable polymer molecular weight.

The polymers disclosed herein may be mixed or compounded with a variety of materials normally mixed with thermoplastics, such as fillers and/or reinforcers such as glass fiber; glass spheres; flaked glass; carbon fiber; carbon blacks; and minerals, such as clay; pigments; colorants; stabilizers; other polymers; tougheners; antioxidants; flame retardants; and plasticizers.

EXAMPLES

Examples 1–8

A three-liter glass kettle was used as the reaction vessel. Heat was supplied to the vessel via an electrically heated metal bath composed of bismuth and tin. Agitation was provided by a Cole-Parmer Master Servodyne Unit equipped with a 50:1 gear reducer. Torque (in D.C. millivolts) and RPM were constantly displayed during operation. Vapors boiled from the vessel passed through a one-piece, 2.5 cm O.C. glass column and through a water cooled condenser equipped with a splitter to drain condensed distillate into a 1 liter graduated cylinder. A nitrogen bleed valve was attached to the system to provide a nitrogen blanket prior to the acetylation, polymerization, and distillation steps of the reaction. After most of the distillate had evolved, an additional nitrogen bleed valve was attached to the vacuum-pump side of the system to allow for control of pressure reduction during the partial vacuum stages of synthesis. A Hastalloy\ stirring agitator was placed in the kettle and guided through the kettle top via a Teflon\ bushing equipped with an o-ring for a pressure tight fit.

The entire vessel was then slid into the rubber-surfaced U-shaped lamps and tightened securely. Nitrogen was supplied to the vessel via a safety bubbler and controlled by a needle valve to insure a nitrogen atmosphere. The one-piece glass column, water condenser with splitter, and graduated cylinder were then attached. Stirring was started at 60 rpm until a good visual mix of monomers and acetic anhydride was obtained (approximately 1–2 minutes) then slowed to 50 rpm. At this point the 170° C. pre-heated metal bath was raised to cover the reaction portion of the vessel. Acetylation occurred while boiled up acetic acid/anhydride was totally refluxed back to the reaction vessel. The stirring speed was kept at 50 rpm in a clockwise direction (looking down from the top). After 40 minutes of total reflux (to insure total acetylation of the diols), the acetic acid distillate was removed via a splitter on the reflux column, and the set temperature was increased 20 degrees every 20 minutes until the temperature had reached 310° C. After about 20 minutes at 310° C., the set temperature was increased to 370° C. to drive off residual acetic acid and maintain a molten resin as it finished under vacuum, which was applied later. After greater than 90% recovery of expected acetic acid, the column, condenser, and graduated cylinder were removed, and a nitrogen line which also was attached to pressure/vacuum reading devices, was installed. The Teflon\ bushing around the stir shaft was fully tightened, and vacuum was slowly applied until the system pressure reached $8.4 \times 10^4$ Pa (abs). After 10 minutes at $8.4 \times 10^4$ Pa (abs), pressure was reduced to about $6.7 \times 10^4$ Pa (abs) for 10 minutes and decreased by $1.7 \times 10^4$ Pa every 10 minutes or as behavior of the resin allowed, (i.e., foaming, etc.) until about $1.7 \times 10^4$ Pa (abs). Pressure was then decreased to $6.7 \times 10^3$ Pa (abs), then to $2.4 \times 10^3$ Pa (abs), over 10 minute intervals at which time full vacuum was applied. The system remained under full vacuum (27 to 66 Pa (abs), until the torque reading rose past about 69 millivolts on the Servodyne torquemeter. At this point, the rpm was then decreased to 30 and the torque allowed to rise above 90 millivolts.

Thereafter, the valve to the vacuum pump was closed and the kettle pressurized with nitrogen via the safety bubbler to show when the system had reached atmospheric pressure. The stirring was stopped, the metal bath lowered, and the system dismantled. The hot kettle was set on a cork ring and the top removed. The stir shaft was lifted out and adhering resin was cut away with scissors or scraped off with a putty knife. Any sublimed impurities that adhered to the upper inside portion of the kettle were cleaned off by scraping with a spatula with the kettle on its side to avoid contamination of the remaining resin in the kettle. After this was done, the kettle was placed back into the metal bath to warm up the resin. With a large spatula-type tool the polymer was recovered as the kettle remained in the bath. Typical yield was about 95% when expecting 0.8 kg of polymer.

First heat Differential Scanning Calorimetry (DSC) at a heating rate of 25° C./min on as-made polymer was used to measure the melting point (Tm) of the polymers made. The Tm was taken as the peak of the melting endotherm.

The polymer obtained was melt blended in a twin screw extruder with glass fiber to obtain a composition containing 30% by weight of glass fiber. This composition was molded on a single screw injection molding machine with barrel temperatures of about 330°–350° C., to obtain standard test pieces. The tensile properties were measured using the ASTM D-638 procedure, the flexural modulus properties were measured by ASTM D-790, and Heat Deflection Temperature (HDT) was measured by ASTM D-648, at 1.82 MPa load.

Finishing times and Tm of the unfilled polyester, and physical properties of the glass fiber filled polyesters are found in Table I.

TABLE I

| Example No. | Polymer Composition Mole % | | | | Tm °C. | Finish Time hr | Tensile Strength MPa | Tensile Elong. % | Flexural Modulus GPa | Flexural Strength MPa | HDT °C. |
|---|---|---|---|---|---|---|---|---|---|---|---|
| | HQ | TPA | NDA | HBA | | | | | | | |
| 1 | 28.6 | 11.4 | 17.1 | 42.9 | 318 | 1.58 | 139 | 2.0 | 12.9 | 190 | 285 |
| 2 | 16.7 | 6.7 | 10.0 | 66.7 | 348 | 0.55 | 138 | 2.0 | 13.0 | 183 | 291 |
| 3 | 22.2 | 8.9 | 13.3 | 55.6 | 328 | 1.18 | 142 | 2.2 | 12.0 | 176 | 283 |

TABLE I-continued

| Example No. | Polymer Composition Mole % | | | | Tm °C. | Finish Time hr | Tensile Strength MPa | Tensile Elong. % | Flexural Modulus GPa | Flexural Strength MPa | HDT °C. |
|---|---|---|---|---|---|---|---|---|---|---|---|
| | HQ | TPA | NDA | HBA | | | | | | | |
| 4 | 22.2 | 10.0 | 12.2 | 55.6 | 337 | 1.17 | 143 | 2.0 | 12.4 | 181 | 287 |
| 5 | 18.2 | 7.3 | 10.9 | 63.6 | 342 | 0.78 | 147 | 2.3 | 12.5 | 180 | 287 |
| 6 | 20.0 | 7.0 | 13.0 | 60.0 | 327 | 1.22 | 143 | 2.1 | 12.5 | 181 | 286 |
| 7 | 20.0 | 10.0 | 10.0 | 60.0 | 364 | 0.77 | 136 | 2.4 | 11.2 | 163 | 289 |
| 8 | 20.0 | 8.0 | 12.0 | 60.0 | 335 | 1.13 | 150 | 2.6 | 12.2 | 178 | 284 |

We claim:

1. A liquid crystalline polyester consisting essentially of repeat units of the formulas:

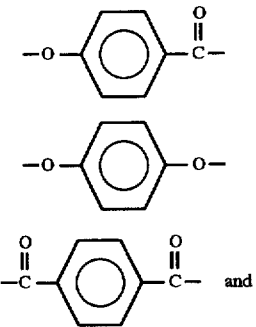

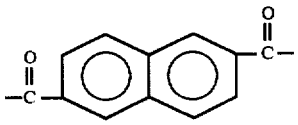

wherein:
repeat unit (I) constitutes 53 to 63 mole percent of said repeat units;
repeat unit (II) constitutes 18.5 to 25 mole percent of said repeat units;
repeat units (IIIa) plus (IIIb) constitute 18.5 to 25 mole percent of said repeat units;
the molar ratio of (IIIa):(IIIb) is 35:65 to 45:55; and
the molar ratio of (II) to [(IIIa)+(IIIb)] is about 1.0.

* * * * *

UNITED STATES PATENT AND TRADEMARK OFFICE
CERTIFICATE OF CORRECTION

PATENT NO. : 5,710,237
DATED : January 20, 1998
INVENTOR(S) : Waggoner et al.

It is certified that error appears in the above-identified patent and that said Letters Patent is hereby corrected as shown below:

Column 6, Line 22, delete "63", insert -- 60 --.

Signed and Sealed this

Twenty-first Day of April, 1998

Attest:

BRUCE LEHMAN

Attesting Officer
Commissioner of Patents and Trademarks